United States Patent
Sasaki

(10) Patent No.: US 12,516,696 B2
(45) Date of Patent: Jan. 6, 2026

(54) DIE APPARATUS

(71) Applicant: TOYOTA BOSHOKU KABUSHIKI KAISHA, Aichi-ken (JP)

(72) Inventor: Ryota Sasaki, Toyota (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 144 days.

(21) Appl. No.: 18/587,548

(22) Filed: Feb. 26, 2024

(65) Prior Publication Data
US 2024/0295241 A1    Sep. 5, 2024

(30) Foreign Application Priority Data

Mar. 2, 2023 (JP) ................................ 2023-031993

(51) Int. Cl.
*F16C 29/04* (2006.01)

(52) U.S. Cl.
CPC .......... *F16C 29/04* (2013.01); *F16C 2322/14* (2013.01)

(58) Field of Classification Search
CPC .............................. F16C 29/04; F16C 2322/14
See application file for complete search history.

(56) References Cited

U.S. PATENT DOCUMENTS

| | | | | |
|---|---|---|---|---|
| 3,357,755 A * | 12/1967 | Danly | .................... | B21D 37/10 384/49 |
| 4,003,283 A * | 1/1977 | Janiszewski | ............ | F16C 29/04 83/637 |
| 4,648,727 A * | 3/1987 | O'Neil | .................... | B21D 37/12 384/906 |
| 5,284,390 A * | 2/1994 | Hanaway | ................ | B21D 37/12 384/903 |
| 5,344,238 A * | 9/1994 | Roch | .................. | G01R 31/2831 384/49 |
| 5,375,932 A * | 12/1994 | Hanaway | ................ | F16C 29/04 384/49 |
| 2020/0406338 A1 * | 12/2020 | Hagiwara | .............. | B21D 39/00 |

FOREIGN PATENT DOCUMENTS

JP         53-133852 U     10/1978

* cited by examiner

*Primary Examiner* — Omar Flores Sanchez
(74) *Attorney, Agent, or Firm* — Greenblum & Bernstein, P.L.C.

(57) ABSTRACT

A die apparatus includes a stationary die including a guide bushing, a movable die including a guide post that reciprocates inside the guide bushing, a ball retainer disposed between an inner surface of the guide bushing and an outer surface of the guide post to guide reciprocation of the guide post, and a restriction member coupled to the guide post. The restriction member faces the ball retainer in an axial direction of the ball retainer to restrict separation of the ball retainer from the guide bushing. A distance between the guide bushing and the restriction member in the axial direction when the movable die is located at a top dead center is shorter than a length of the ball retainer in the axial direction.

6 Claims, 3 Drawing Sheets

DIE APPARATUS

BACKGROUND

1. Field

The present disclosure relates to a die apparatus.

2. Description of Related Art

Conventional die apparatuses include a stationary die having a cylindrical guide bushing and a movable die having a columnar guide post that reciprocates inside the guide bushing. A cylindrical ball retainer that guides the reciprocation of the guide post is disposed between the inner surface of the guide bushing and the outer surface of the guide post.

The ball retainer includes a cylindrical holder having support holes. The ball retainer also includes balls that are supported in the support holes in a rollable manner, respectively. Each ball that receives a predetermined preload is in contact with the inner surface of the guide bushing and the outer surface of the guide post.

When the movable die moves toward and away from the stationary die, the guide post reciprocates inside the guide bushing. As the balls rotate in the forward and reverse directions, the ball retainer reciprocates in the axial direction between the guide bushing and the guide post. Thus, the reciprocation of the guide post is guided.

The reciprocation of the ball retainer may produce slippage between the ball retainer and the guide post. As a result, the ball retainer may gradually move in a direction in which the ball retainer comes out of the guide bushing, thereby being separated from the guide bushing.

Japanese Laid-Open Utility Model Publication No. 53-133852 discloses a die apparatus including a stopper ring that restricts the separation of a ball retainer from a guide bushing. The stopper ring is coupled to the end of the guide bushing into which the guide post is inserted. The stopper ring has a through-hole into which the guide post is inserted. The through-hole has a diameter that is smaller than the inner diameter of the guide bushing. The through-hole has a peripheral edge facing one end surface of the ball retainer in the axial direction. This limits the movement range of the ball retainer and thus prevents the separation of the ball retainer from the guide bushing.

When the die apparatus undergoes maintenance, the guide post may be removed from the guide bushing. If an appropriate preload is being applied to the balls of the ball retainer, the ball retainer moves together with the guide post. Thus, when the guide post is removed from the guide bushing, the ball retainer interferes with the stopper ring. Accordingly, to remove the guide post from the guide bushing, the stopper ring may be detached from the guide bushing. Detaching the stopper ring may reduce the maintainability of the die apparatus. Hence, it is desirable for the die apparatus to restrict the separation of the ball retainer from the guide bushing and limit a decrease in the maintainability.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A die apparatus includes a stationary die including a cylindrical guide bushing, a movable die including a guide post that reciprocates inside the guide bushing, a ball retainer disposed between an inner surface of the guide bushing and an outer surface of the guide post to guide reciprocation of the guide post, and a restriction member coupled to the guide post. The restriction member faces the ball retainer in an axial direction of the ball retainer to restrict separation of the ball retainer from the guide bushing. A distance between the guide bushing and the restriction member in the axial direction when the movable die is located at a top dead center is shorter than a length of the ball retainer in the axial direction.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

A die apparatus according to an embodiment will now be described with reference to FIGS. 1 to 3.

Die Apparatus

Figure 1:
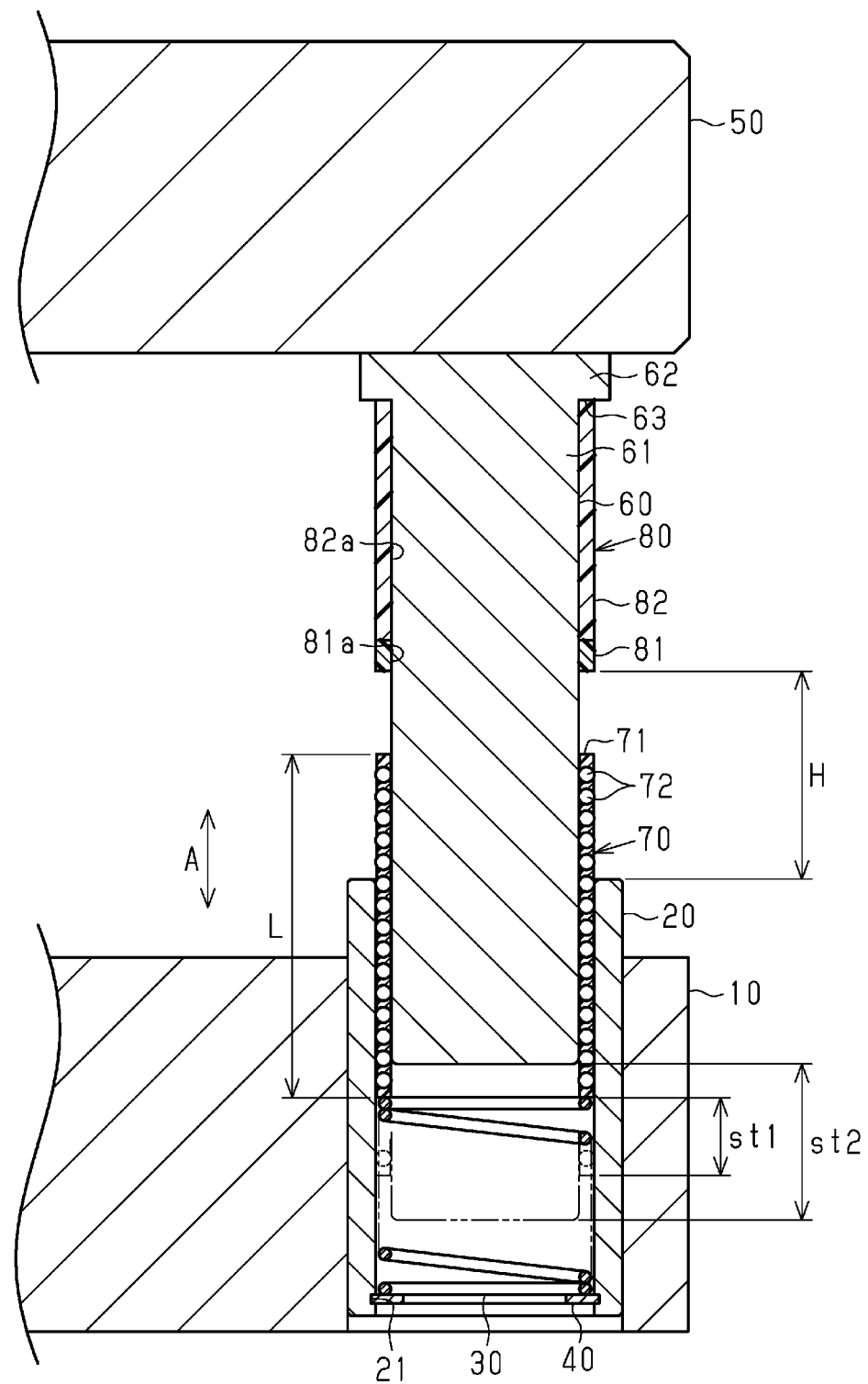
FIG. 1 is a cross-sectional view of a die apparatus according to an embodiment, illustrating the state in which a movable die is located at the top dead center.

As shown in FIG. 1, the die apparatus includes a stationary die 10 and a movable die 50. The movable die 50 is movable toward and away from the stationary die 10. The movable die 50 is disposed, for example, above the stationary die 10.

Examples of the die apparatus include a pressing device that punches a product out of a workpiece. The workpiece is conveyed between a punch (not shown) fixed to the movable die 50 and a die (not shown) fixed to the stationary die 10.

A cylindrical guide bushing 20 is disposed inside the stationary die 10. The upper end of the guide bushing 20 protrudes from the upper surface of the stationary die 10.

The movable die 50 includes a cylindrical guide post 60. The guide post 60 protrudes from the lower surface of the movable die 50 and extends toward the stationary die 10. As the movable die 50 moves toward and away from the stationary die 10, the guide post 60 vertically reciprocates inside the guide bushing 20, thereby guiding the reciprocation of the movable die 50.

The guide post 60 includes a columnar body 61 and a large-diameter portion 62, which has a larger diameter than the body 61. The large-diameter portion 62 is in contact with the lower surface of the movable die 50.

The die apparatus has a restriction surface 63 that restricts movement of a restriction member 80, which will be described later. The restriction surface 63 is disposed, for example, over the entire lower end surface of the large-diameter portion 62.

A cylindrical ball retainer 70 is disposed between the inner surface of the guide bushing 20 and the outer surface of the guide post 60.

A spring 30 is accommodated in the guide bushing 20. The spring 30 is, for example, a compression coil spring. The spring 30 urges the ball retainer 70 toward the movable die 50.

A support member 40 that supports the spring 30 is disposed at a lower end of the guide bushing 20 inside the guide bushing 20. The support member 40 is fitted into a groove 21 that is formed over the entire inner circumferential surface of the guide bushing 20. The support member 40 is, for example, a C-shaped stopper ring.

Ball Retainer 70

The ball retainer 70 includes a cylindrical holder 71 and balls 72. The balls 72 are respectively supported by support holes in the holder 71 in a rollable manner. Each ball 72 protrudes from the inner surface and the outer surface of the holder 71.

The holder 71 is made of, for example, a metal material such as an aluminum alloy. The ball 72 is made of, for example, an iron-based metal material.

A gap is created between the outer surface of the holder 71 and the inner surface of the guide bushing 20. Further, a gap is created between the inner surface of the holder 71 and the outer surface of the guide post 60. Each ball 72 is in contact with the inner surface of the guide bushing 20 and the outer surface of the guide post 60.

Each ball 72 has a slightly larger diameter than the gap between the inner surface of the guide bushing 20 and the outer surface of the guide post 60. Thus, in a state in which the ball retainer 70 is located between the guide bushing 20 and the guide post 60, preload is applied to each ball 72.

When receiving an appropriate preload, each ball 72 rotates in the forward and reverse directions without slipping relative to the guide bushing 20 and the guide post 60 as the guide post 60 reciprocates. Thus, the ball retainer 70 reciprocates in the axial direction of the ball retainer 70 (hereinafter simply referred to as the axial direction A) between the guide bushing 20 and the guide post 60.

When the balls 72 do not slip relative to the guide bushing 20 and the guide post 60, the movement amount of the ball retainer 70 is half the movement amount of the guide post 60. Thus, when the movable die 50 reciprocates between the top dead center and the bottom dead center, stroke st1 of the ball retainer 70 is half stroke st2 of the guide post 60. When the ball retainer 70 reciprocates in the axial direction A, the upper end of the ball retainer 70 constantly protrudes from the guide bushing 20.

The lower end surface of the ball retainer 70 is supported by the spring 30. In a state in which the guide post 60 is located inside the guide bushing 20, the ball retainer 70 downwardly presses the spring 30. Thus, the ball retainer 70 is urged toward the movable die 50 by the spring 30.

When the balls 72 are worn due to the reciprocation of the ball retainer 70, the preload applied to the balls 72 decreases. This may cause slippage between each ball 72 and the guide post 60. As a result, the position of the ball retainer 70 may deviate upward from the range of a normal reciprocation. In other words, the upper limit position of the reciprocation range of the ball retainer 70 may move upward. Particularly, since the ball retainer 70 is upwardly urged by the spring 30, the wear of the balls 72 facilitates upward movement of the ball retainer 70.

Restriction Member 80

When the upper limit position of the reciprocation range of the ball retainer 70 is moved upward, the ball retainer 70 may be separated from the guide bushing 20. Thus, the restriction member 80, which is cylindrical, is coupled to the guide post 60 to restrict the separation of the ball retainer 70 from the guide bushing 20. The restriction member 80 faces the ball retainer 70 in the axial direction A.

The restriction member 80 includes a first member 81 and a second member 82, each having a cylindrical shape. The first member 81 and the second member 82 are fitted to the body 61 of the guide post 60.

The first member 81 faces the upper end surface of the ball retainer 70 in the axial direction A. The second member 82 is adjacent to the first member 81 on the opposite side of the first member 81 from the ball retainer 70. That is, the second member 82 is located above the first member 81. The lower end surface of the second member 82 is in contact with the upper end surface of the first member 81.

The end of the restriction member 80 that is opposite to the end of the restriction member 80 facing the ball retainer 70, i.e., the upper end of the second member 82, is in contact with the restriction surface 63. Thus, the second member 82 is located between the first member 81 and the large-diameter portion 62.

The length of the first member 81 in the axial direction A is shorter than the length of the second member 82 in the axial direction A. The outer diameter of the first member 81 and the outer diameter of the second member 82 are substantially equal to each other. The outer diameters of the first member 81 and the second member 82 are larger than the outer diameter of the holder 71 of the ball retainer 70.

The first member 81 and the second member 82 are made of an elastic material. The first member 81 and the second member 82 are made of, for example, a resin material such as urethane.

The first member 81 has a circular first insertion hole 81a into which the body 61 is inserted. When the first member 81 is detached from the body 61, the inner diameter of the first insertion hole 81a is smaller than the outer diameter of the body 61. The first member 81 is fitted to the body 61 with the first insertion hole 81a widened. Thus, the inner surface of the first insertion hole 81a and the outer surface of the body 61 are in close contact with each other.

The second member 82 has a circular second insertion hole 82a into which the body 61 is inserted. The inner diameter of the second insertion hole 82a is slightly larger than the inner diameter of the first insertion hole 81a. Thus, the inner diameter of the second insertion hole 82a is slightly larger than the outer diameter of the body 61. Accordingly, a gap (not shown) is created between the inner surface of the second insertion hole 82a and the outer surface of the body 61. In other words, the second member 82 is coupled to the body 61 with play. The gap between the inner surface of the second insertion hole 82a and the outer surface of the body 61 is smaller than the gap between the inner surface of the holder 71 and the outer surface of the body 61.

Distance H between the guide bushing 20 and the restriction member 80 in the axial direction A when the movable die 50 is located at the top dead center is shorter than length L of the ball retainer 70 in the axial direction A. Distance H is the distance between the upper end surface of the guide bushing 20 and the lower end surface of the first member 81 in the axial direction A.

Figure 2:
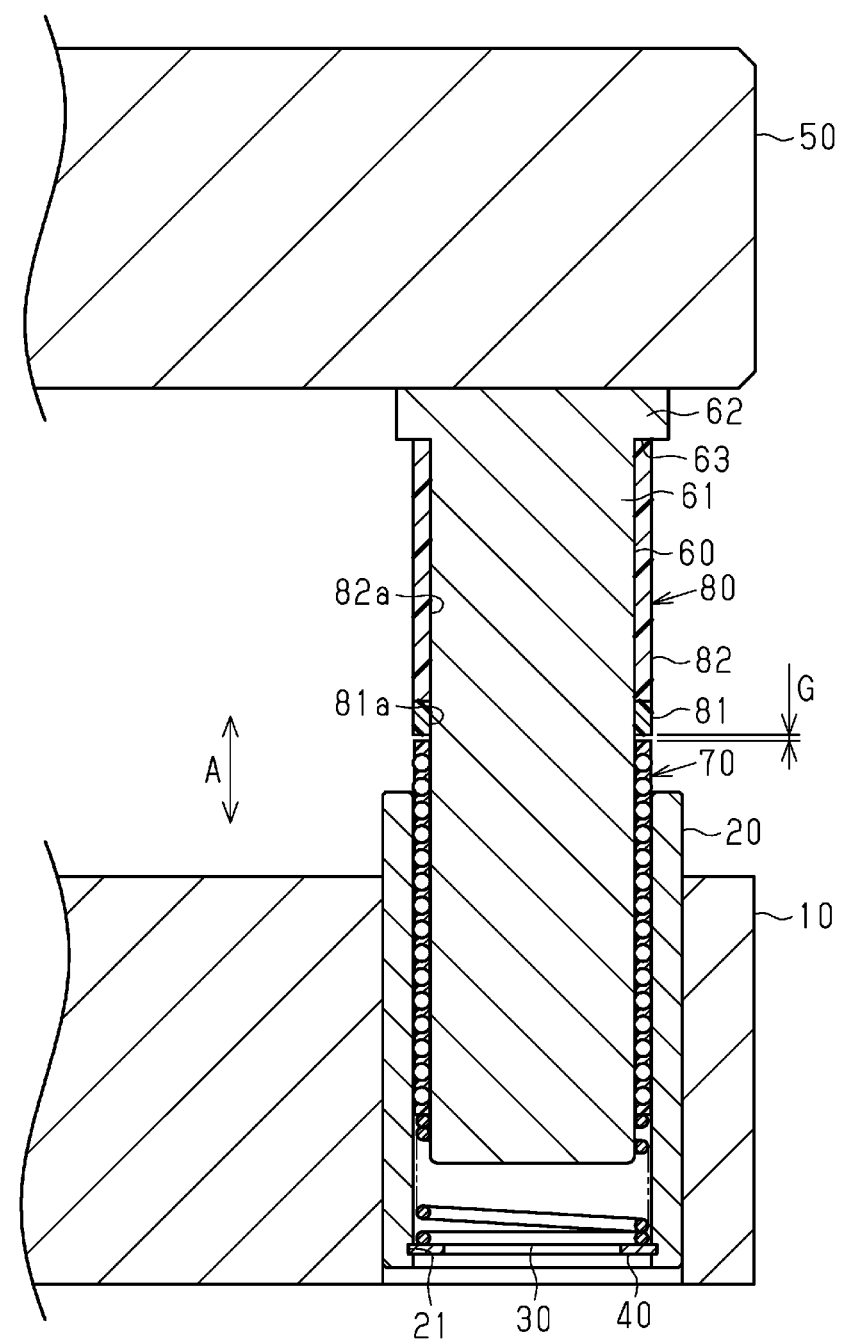
FIG. 2 is a cross-sectional view illustrating the state of the movable die shown in FIG. 1 when it is located at the bottom dead center.

As shown in FIG. 2, when the movable die 50 is located at the bottom dead center, gap G is created between the upper end surface of the ball retainer 70 and the lower end surface of the first member 81. Thus, when no slippage occurs between each ball 72 and the guide post 60, the ball retainer 70 and the first member 81 do not come into contact with each other during reciprocation of the guide post 60. When the movable die 50 is located at the bottom dead center, the upper end surface of the ball retainer 70 and the lower end surface of the first member 81 may be in contact with each other.

The operation of the present embodiment will now be described.

As shown in FIGS. 1 and 2, as the guide post 60 reciprocates within the guide bushing 20, the ball retainer 70 reciprocates between the guide bushing 20 and the guide post 60. The restriction member 80 is coupled to the guide post 60 to face the ball retainer 70 in the axial direction A of the ball retainer 70. Distance H between the guide bushing 20 and the restriction member 80 is shorter than length L of the ball retainer 70. Thus, when the slippage produced between each ball 72 of the ball retainer 70 and the guide post 60 causes the reciprocation range of the ball retainer 70 to extend closer to the movable die 50, the ball retainer 70 comes into contact with the restriction member 80. This limits the reciprocation range of the ball retainer 70 so that the ball retainer 70 will not move beyond the restriction member 80. As a result, the separation of the ball retainer 70 from the guide bushing 20 is restricted.

Figure 3:
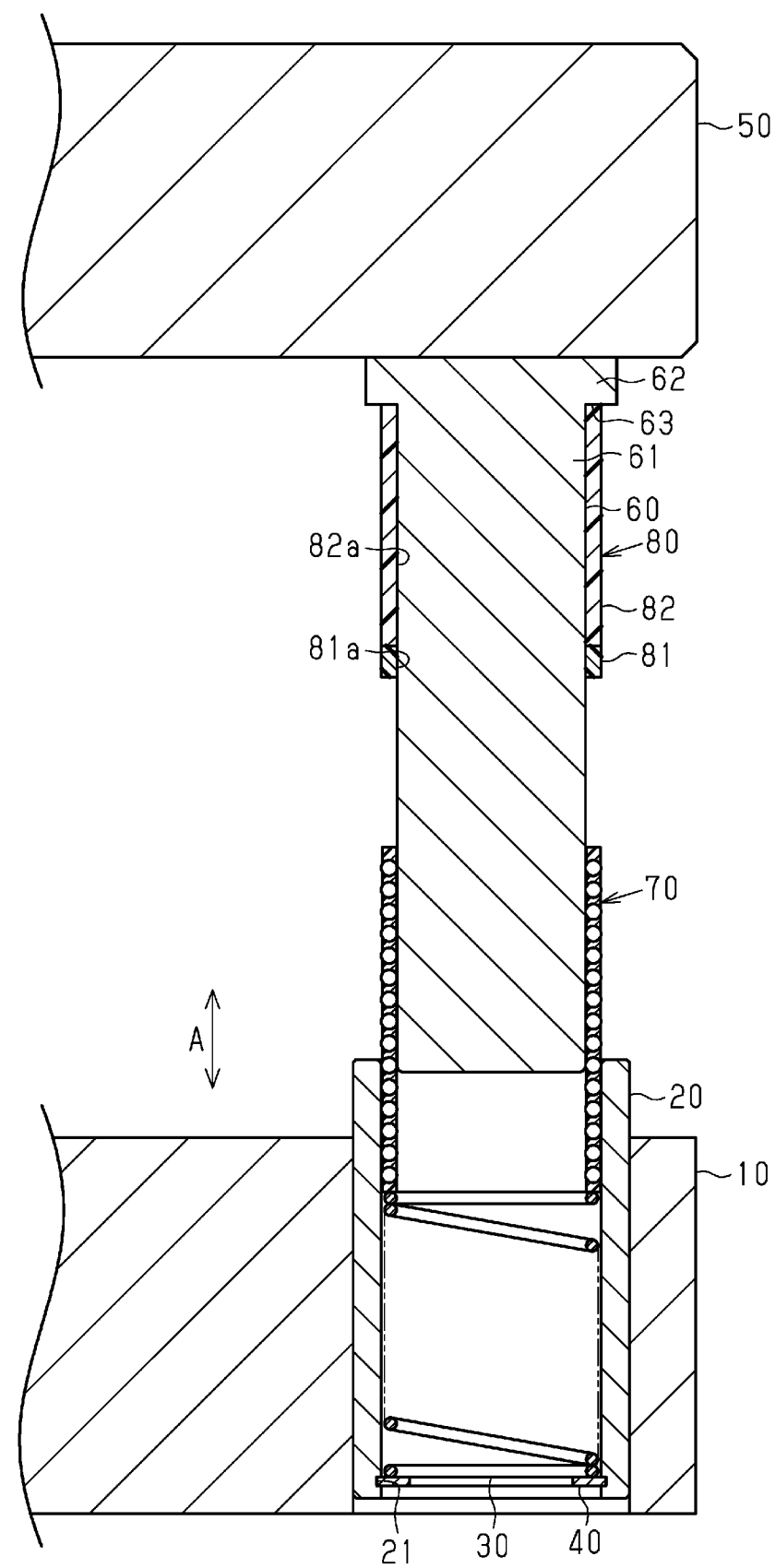
FIG. 3 is a cross-sectional view illustrating the guide post of FIG. 1 being removed from the guide bushing.

As shown in FIG. 3, during maintenance of the die apparatus, the removal of the guide post 60 from the guide bushing 20 results in the upward movement of the restriction member 80 together with the guide post 60. Consequently, even if the ball retainer 70 ascends as the guide post 60 moves, the removal of the guide post 60 will not cause the ball retainer 70 to interfere with the restriction member 80. This facilitates the smooth removal of the guide post 60 from the guide bushing 20.

The advantages of the present embodiment will now be described.

(1) The die apparatus includes the stationary die 10, the movable die 50, the ball retainer 70, and the restriction member 80. The stationary die 10 includes the guide bushing 20. The movable die 50 includes the guide post 60. The ball retainer 70 is disposed between the inner surface of guide bushing 20 and the outer surface of guide post 60. The restriction member 80 is coupled to the guide post 60. Distance H between the guide bushing 20 and the restriction member 80 in the axial direction A when the movable die 50 is located at the top dead center is shorter than length L of the ball retainer 70 in the axial direction A.

This configuration produces the above operation, and thus limits a decrease in the maintainability of the die apparatus while preventing the separation of the ball retainer 70 from the guide bushing 20.

(2) The restriction member 80 includes the first member 81, which faces the ball retainer 70 in the axial direction A, and the second member 82, which is adjacent to the first member 81 on the opposite side of the first member 81 from the ball retainer 70. The second member 82 is made of an elastic material.

In this configuration, when the ball retainer 70 reciprocates to collide with the first member 81, the impact force acting on the first member 81 is readily absorbed by the second member 82. This prevents breakage of the first member 81 and consequently prevents breakage of the restriction member 80.

Further, in this configuration, the restriction member 80 can be employed in another die apparatus including the guide post 60 with a different length or stroke by changing the length of the second member 82 in the axial direction A. This enhances the versatility of the restriction member 80.

(3) The first member 81 is made of an elastic material.

In this configuration, the first member 81 and the second member 82 are both made of an elastic material. Thus, when the ball retainer 70 reciprocates to collide with the first member 81, the impact force acting on the first member 81 and the second member 82 is readily absorbed. This prevents the breakage of the restriction member 80.

(4) The inner surface of the first insertion hole 81a and the outer surface of the body 61 are in close contact with each other. The gap is created between the inner surface of the second insertion hole 82a and the outer surface of the body 61.

In this configuration, since the inner surface of the first insertion hole 81a of the first member 81 and the outer surface of the guide post 60 are in close contact with each other, the first member 81 is less likely to be displaced from the guide post 60 after collision of the ball retainer 70 with the first member 81. In addition, the gap between the inner surface of the second insertion hole 82a of the second member 82 and the outer surface of the guide post 60 facilitates coupling of the second member 82 to the guide post 60. This improves the maintainability of the die apparatus while effectively preventing the separation of the ball retainer 70 from the guide bushing 20.

(5) The die apparatus includes the restriction surface 63, which restricts the movement of the restriction member 80 by coming into contact with the end of the restriction member 80 opposite to the end of the restriction member 80 facing the ball retainer 70.

In this configuration, since the restriction member 80 comes into contact with the restriction surface 63, the restriction member 80 is less likely to be displaced from the guide post 60 after collision of the ball retainer 70 with the restriction member 80. This further prevents the separation of the ball retainer 70 from the guide bushing 20.

Modifications

The present embodiment may be modified as follows. The present embodiment and the following modifications can be combined as long as they remain technically consistent with each other.

The guide post 60 does not have to include the large-diameter portion 62. In this case, the restriction surface 63 may be located on the lower surface of the movable die 50. Alternatively, the restriction surface 63 may be located on the lower surface of the guide post 60 or on the lower surface of another member fixed to the movable die 50.

The die apparatus does not have to include the restriction surface 63. In this case, the upper end surface of the restriction member 80 does not have to be in contact with any part of the die apparatus. In this configuration, it is preferred that the restriction member 80 is fixed to the guide post 60 in an immovable manner.

A gap may be created between the inner surface of the first insertion hole 81a and the outer surface of the body 61 if the first member 81 is fixed to the body 61.

The inner surface of the second insertion hole 82a and the outer surface of the body 61 may be in close contact with each other.

The first member 81 may be made of a metal material. In this case, a metal material having a hardness less than or equal to that of the holder 71 of the ball retainer 70 is selected as the material of the first member 81 to prevent the breakage of the ball retainer 70. Examples of the material of the first member 81 include an aluminum alloy.

The second member 82 may be made of a metal material.

The length of the first member 81 in the axial direction A and the length of the second member 82 in the axial direction A may be changed. For example, the length of the first member 81 in the axial direction A may be longer than the length of the second member 82 in the axial direction A.

The material of the first member 81 and the second member 82 may be rubber (e.g., nitrile rubber) or a resin material (e.g., polyamide).

The first member 81 and the second member 82 may be fixed to the body 61 using adhesive or a fixing member.

The restriction member 80 may include a single member made of an elastic material. In this configuration, when the ball retainer 70 reciprocates to collide with the restriction member 80, the impact force acting on the restriction member 80 is readily absorbed. This prevents the breakage of the restriction member 80.

The restriction member 80 may include a single member made of a metal material. In this case, a metal material having a hardness less than or equal to that of the holder 71 of the ball retainer 70 is selected as the material of the restriction member 80 to prevent the breakage of the ball retainer 70. Examples of the material of the restriction member 80 include an aluminum alloy.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A die apparatus, comprising:
   a stationary die including a cylindrical guide bushing;
   a movable die including a guide post that reciprocates inside the guide bushing;
   a ball retainer disposed between an inner surface of the guide bushing and an outer surface of the guide post to guide reciprocation of the guide post; and
   a restriction member coupled to the guide post, wherein
   the restriction member faces the ball retainer in an axial direction of the ball retainer to restrict separation of the ball retainer from the guide bushing, and
   a distance between the guide bushing and the restriction member in the axial direction when the movable die is located at a top dead center is shorter than a length of the ball retainer in the axial direction.

2. The die apparatus according to claim 1, wherein the restriction member is made of an elastic material.

3. The die apparatus according to claim 1, wherein the restriction member includes:
   a first member facing the ball retainer in the axial direction; and
   a second member adjacent to the first member on an opposite side of the first member from the ball retainer, and
   the second member is made of an elastic material.

4. The die apparatus according to claim 3, wherein the first member is made of an elastic material.

5. The die apparatus according to claim 3, wherein the first member and the second member have a first insertion hole and a second insertion hole into which the guide post is inserted, respectively,
   an inner surface of the first insertion hole and the outer surface of the guide post are in close contact with each other, and
   a gap is created between an inner surface of the second insertion hole and the outer surface of the guide post.

6. The die apparatus according to claim 1, further comprising:
   a restriction surface that restricts movement of the restriction member by coming into contact with an end of the restriction member opposite to an end of the restriction member facing the ball retainer.

* * * * *